(12) United States Patent
Lisanti et al.

(10) Patent No.: US 10,308,130 B2
(45) Date of Patent: Jun. 4, 2019

(54) DYNAMO FOR BICYCLES

(71) Applicant: ZEHUS S.P.A., Milan (IT)

(72) Inventors: Paolo Lisanti, Lallio (IT); Marcello Segato, Milan (IT); Giovanni Alli, Legnano (IT); Daniele Berretta, Caronno Pertusella (IT); Paolo Giudici, Arese (IT)

(73) Assignee: ZEHUS S.p.A. (IT)

( * ) Notice: Subject to any disclaimer, the term of this patent is extended or adjusted under 35 U.S.C. 154(b) by 0 days.

(21) Appl. No.: 15/662,505

(22) Filed: Jul. 28, 2017

(65) Prior Publication Data

US 2018/0029492 A1    Feb. 1, 2018

(30) Foreign Application Priority Data

Jul. 29, 2016 (IT) .................. 102016000080022

(51) Int. Cl.
*B60L 11/18* (2006.01)
*B62M 6/90* (2010.01)
(Continued)

(52) U.S. Cl.
CPC ............. *B60L 11/1861* (2013.01); *B60L 7/18* (2013.01); *B62J 6/12* (2013.01); *B62M 6/45* (2013.01); *B62M 6/50* (2013.01); *B62M 6/60* (2013.01); *B62M 6/90* (2013.01); *H02J 7/1407* (2013.01); *B60L 58/12* (2019.02); *B60L 2200/12* (2013.01); *Y02T 10/7005* (2013.01);
(Continued)

(58) Field of Classification Search
CPC ........ B06L 11/1861; B62M 6/60; B62M 6/90; B62M 6/50

USPC ....................................................... 318/139
See application file for complete search history.

(56) References Cited

U.S. PATENT DOCUMENTS

| 3,921,745 A | 11/1975 | McCulloch et al. | |
|---|---|---|---|
| 2011/0001442 A1* | 1/2011 | Lee .................... | B62M 6/45 318/139 |
| 2012/0081080 A1* | 4/2012 | Aoki .................. | B62M 6/45 320/137 |

FOREIGN PATENT DOCUMENTS

| EP | 1612084 | * | 1/2006 |
|---|---|---|---|
| EP | 2436588 | | 4/2012 |
| GB | 2485216 | | 5/2012 |

OTHER PUBLICATIONS

IT20160008022, Jul. 29, 2016, Written Opinion.

* cited by examiner

*Primary Examiner* — Kawing Chan
*Assistant Examiner* — Bradley R Brown
(74) *Attorney, Agent, or Firm* — Shuttleworth & Ingersoll, PLC; Timothy J. Klima

(57) ABSTRACT

A dynamo that is connectable to a wheel of a bicycle may include
 an electric machine capable of alternatively operating as a generator and as a motor and
 one or more batteries connected to the electric machine in order to be capable of exchanging energy with this latter. The dynamo may also include
 a control unit configured for commanding the electric machine
 according to a first mode, wherein the electric machine acts as a generator and is capable of converting rotational mechanical energy of the wheel into electric energy to be stored in the one or more batteries, and
 according to a second mode, wherein the electric machine acts as a motor and is capable of delivering additional (Continued)

power to the bicycle wheel by withdrawing energy from the one or more batteries. The dynamo may further include one or more command members connected to the control unit.

13 Claims, 3 Drawing Sheets

(51) Int. Cl.
*B62M 6/50* (2010.01)
*B62M 6/60* (2010.01)
*B62M 6/45* (2010.01)
*B60L 7/18* (2006.01)
*B62J 6/12* (2006.01)
*H02J 7/14* (2006.01)
*B60L 58/12* (2019.01)

(52) U.S. Cl.
CPC .......... *Y02T 10/705* (2013.01); *Y02T 10/7044* (2013.01); *Y02T 10/7258* (2013.01)

DYNAMO FOR BICYCLES

RELATED APPLICATIONS

This application claims the benefit of Italian Patent Application No. 102016000080022, filed on Jul. 29, 2016, the entire contents of which are incorporated herein by reference.

FIELD OF THE INVENTION

The present invention refers to a dynamo for a bicycle, in an exemplifying and non-limiting way of a so-called "hub dynamo" type.

BACKGROUND

Bicycles provided with devices known as dynamos in order to convert mechanical energy, normally generated by the rotation of the front wheel, into electric energy, for example for supplying the lamps of the bicycle, are known.

The standard dynamos comprise a cylindrical case which houses inside an alternator, the shaft thereof projects from the case and is rotated by a contact element which in turn contacts the bicycle wheel along the circumference thereof, and consequently rolls on the same. The current produced by the alternator is converted in continuous current, for example by a commutator, and then supplies a light of the bicycle, for example.

Moreover, dynamos of the so-called "hub dynamo" type have been proposed which are directly attached to the hub of a bicycle wheel and rotate integrally with it around the hub. Such hub-dynamos comprise inside an electric generator which produces an alternate current due to the wheel rotation, this current then is used for supplying the bicycle lights or possibly also external devices, such as for example a smartphone. The hub-dynamos, in comparison with the standard dynamos, generally generate a smaller rolling resistance and therefore require less effort to a cyclist. However, also these latter generate a not negligible rolling resistance, proportional to the wheel speed and moreover increasing as a function of the number of loads supplied by it.

SUMMARY OF THE INVENTION

It is an object of the present invention to make available a bicycle dynamo which has a better energy efficiency than the dynamos according to the prior art and which further enables to take an average effort of a cyclist to a level less than the one of the dynamos according to the prior art.

This and other objects are met by a bicycle dynamo according to claim 1.

BRIEF DESCRIPTION OF THE DRAWINGS

For better understanding the invention and appreciating the advantages thereof, some exemplifying and non-limiting embodiments thereof will be described in the following with reference to the attached drawings, wherein.

DETAILED DESCRIPTION OF THE INVENTION

Figure 1:
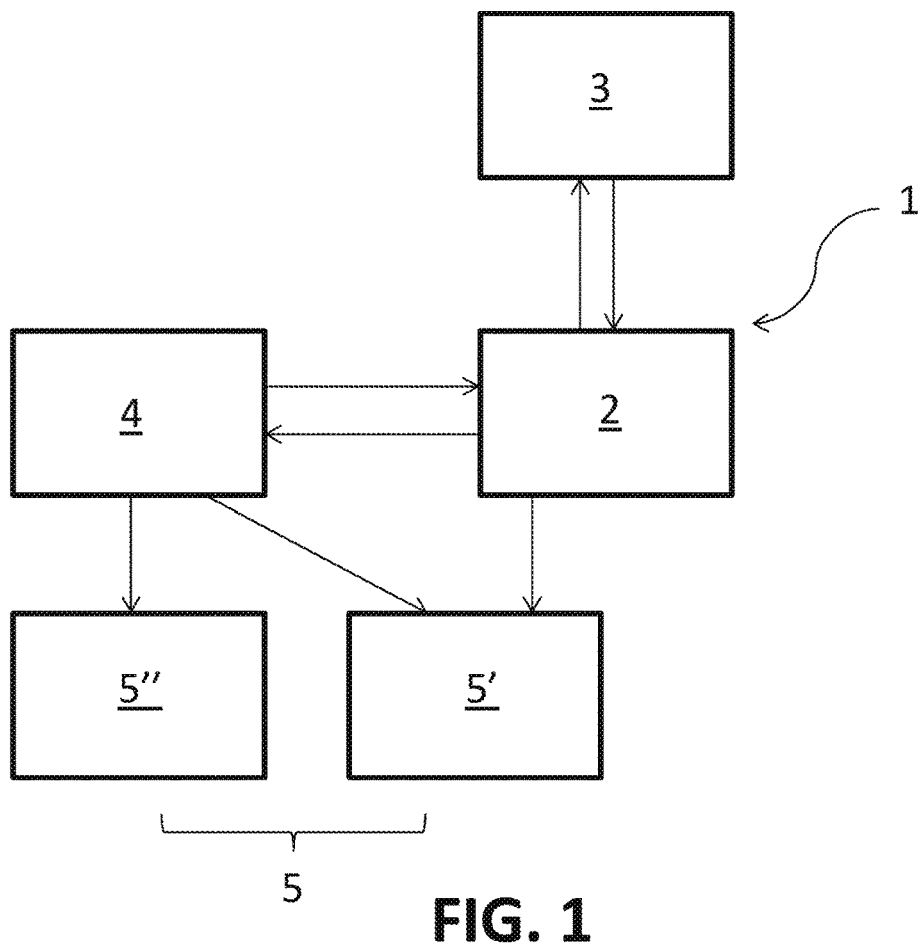
FIG. 1 is a block diagram illustrating the operation of the dynamo according to the invention.

With reference to the block diagram in FIG. 1, a dynamo for a bicycle is indicated by the reference number 1. The dynamo can be in an exemplifying and non-limiting way, of a hub type, and is adapted to be connected to a wheel 3 of a bicycle, for example to the front wheel. For this reason, the dynamo 1 can for example comprise a closure body (not shown in the figures) adapted to receive inside the means necessary to operate the dynamo itself. The closure body can be rotatively integrally connected to the bicycle wheel 3. For example, for this purpose, the closure body can comprise suitable holes to be coupled with the spokes of the bicycle wheel 3. The closure body can be rotatively mounted to the hub of the wheel to which the dynamo is connected, so that it can rotate with it.

It is observed that the closure body, if provided, and more generally the dynamo 1 itself, is mechanically decoupled from the bicycle pedals and from the chain (or, more generally, from the transmission elements connecting the pedals to the driving wheel) because it does not directly interact with them, and therefore is devoid of mechanisms for connecting it to them, such as free wheels or similar.

Preferably, the dynamo 1 comprises inside the closure body, an electric machine 2 capable of acting as a generator and, as it will be more specifically described in the following, also as a motor. Particularly, the electric machine 2 can comprise a rotor capable of integrally rotating with the wheel 3 (because in turn is integral with the closure body, for example) and a stator integral with the hub, so that the rotation of the bicycle wheel 3 is translated in a rotation of the rotor with respect to the stator, consequently alternate electric current is produced. Converting mechanical energy (kinetic energy due to the wheel rotation) into electric energy entails a rolling resistance of the bicycle which is perceived by the pedaling cyclist. For example, the electric machine 2 can comprise a brushless motor, capable of operating both as a generator and as a motor.

The dynamo 1 comprises one or more batteries 4 connected to the electric machine 2 so that they can be recharged by this latter, when it acts as a generator, due to the rotation of the wheel 3. Preferably, the batteries 4 are also housed inside the closure body.

Moreover, the batteries 4, as it will be more particularly illustrated in the following, can in turn supply electric energy to the electric machine 2 so that this can operate as a motor.

Advantageously, it is observed that the dynamo 1 is devoid of connectors for connecting the batteries to external energy sources, and therefore the batteries 4 are only recharged by the electric machine 2 acting as a generator due to the rotation of the bicycle wheel.

External devices 5, such as the front and/or rear lamps of the bicycle, or devices such as smartphones, or detectors of biometric parameters of the cyclist (such as the heart rate) can be connected to the dynamo 1 and for this purpose the dynamo 1 comprises suitable outlets for electrically connecting them. Preferably, the dynamo 1 particularly comprises one or more outlets for supplying so-called critical loads 5', and one or more outlets for supplying non-critical loads 5". The critical loads are those external devices which must be electrically supplied by the dynamo 1 also if the batteries 4 are completely discharged (the lamps of the bicycle, for example), and therefore are directly suppliable not only by the batteries 4, but also by the electric machine 2 when this acts as a generator. The non-critical loads are those electric devices which do not hamper a safe operation of the bicycle (the smartphones, for example). These are only supplied by the batteries 4 and therefore cannot receive energy if the batteries are completely discharged.

FIG. 1 schematically illustrates the directions of possible energy flows among the wheel 3, electric machine 2, batteries 4, critical loads 5' and non-critical loads 5".

Figure 2:
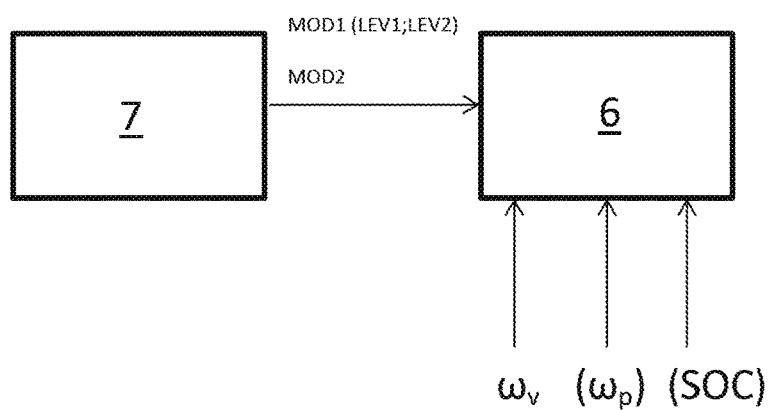
FIG. 2 is a block diagram illustrating the operation of the control unit of the dynamo according to an embodiment of the invention.

In order to control the above-mentioned energy flows, and also in order to enable the cyclist to act on them, the dynamo 1 comprises a control unit 6 schematically shown in FIG. 2.

With reference to FIG. 2, the control unit 6 is configured for commanding the electric machine 2 according to two different modes.

According to a first mode, the electric machine 2 is commanded to act as a generator, in other words to recover a portion of the mechanical energy generated by the rotation of the bicycle wheel. Such energy is converted into electric energy by the electric machine 2 which acts as a generator and is stored in the batteries 4. In turn, such first mode can be set according to at least two different recovery levels. According to a first recovery level, the power recovered by the electric machine 2 which operates as a generator, is maintained low, in this way also the rolling resistance due to the electric machine is also low. This setting can be maintained, for example, during the standard advancement conditions of the bicycle, with or without a pedaling cyclist. Based on a second recovery level, instead, the power amount recovered by the electric machine 2 which operates as a generator, is maintained higher than the first level (with the same motion conditions of the bicycle, particularly with the same speed conditions). This setting, which obviously increases also the advancement resistance due to the electric machine, can be exploited for example for recovering energy when the bicycle is going along a descent and/or when is braking, in other words when the cyclist is not pedaling, so that he/she does not perceive any additional effort.

Instead, according to a second mode, the electric machine 2 is commanded for operating as a motor. Therefore, the dynamo 1 is used not only for storing energy, but also for supplying extra power to the cyclist if he/she needs it. The energy for supplying the electric machine 2 operating as a motor is, in this case, withdrawn from the battery 4.

In order to enable the cyclist to select between the first (MOD1) and second operative modes (MOD2), and in case of the first mode, between the first (LEV1) and second energy recovery levels (LEV2), the control unit 6 can be connected to one or more command members 7 or, more generally, to a human-machine interface unit. For example, a first lever for selecting between the first and second operative modes can be provided, and a second lever (or the same first lever movable to further positions) for selecting between the first and second energy recovery levels when the first mode is selected, can be provided. As a further alternative, the first and second levels of the first mode can be related to the braking action of the cyclist. For example, a sensor delivering a pulse to the control unit when a braking action is detected, can be associated to the brake lever, the sensor indicating the switching from the first to the second levels. Or moreover, to the pedals can be associated a sensor adapted to detect a cyclist backward pedal-thrust, this backward pedal-thrust being understood as an energy recovery request, therefore the sensor is capable in turn to deliver a pulse to the control unit 6 so that this latter selects the second level of energy to be recovered. According to a further alternative, one or more of the above-mentioned selections can be commanded by the cyclist by means of an external device, such as a smartphone connected to the control unit 6, on which an application capable of being interfaced with the control unit 6, is loaded. According to a further variant, the selection between the first (MOD1) and second operative modes (MOD2), and/or between the first (LEV1) and second energy recovery levels (LEV2) can be performed at least partially automatically by the control unit 6, based on signals from suitable sensors (for example, a slope sensor can indicate a descent condition, which can correspond to a condition activating the second level of the first operative mode, or an ascent condition which can correspond to a condition activating the second operative mode).

Preferably, it is observed that the first operative mode set to the first energy recovery level is the standard operative mode of the electric machine. In other words, the control unit 6, without instructions from the cyclist or without specific signals from the sensors, commands the electric machine to operate according to the first recovery level of the first operative mode.

Further, it is observed that two energy recovery levels of the first operative mode can be provided. According to a possible embodiment, the control unit 6 is configured for commanding the electric machine 2 to gradually and continuously switch from the first to the second energy recovery levels, possibly by setting at an intermediate level, and vice versa. For this purpose, for example, the command member can comprise an electric lever capable of continuously switching between a first position corresponding to the first recovery level, to a second position corresponding to a second recovery level, through intermediate positions corresponding to intermediate energy recovery levels.

Different operative modes of the electric machine 2 performed by the control unit 6 will be described in the following.

First mode, first level: energy recovery, low resistance

Figure 3:
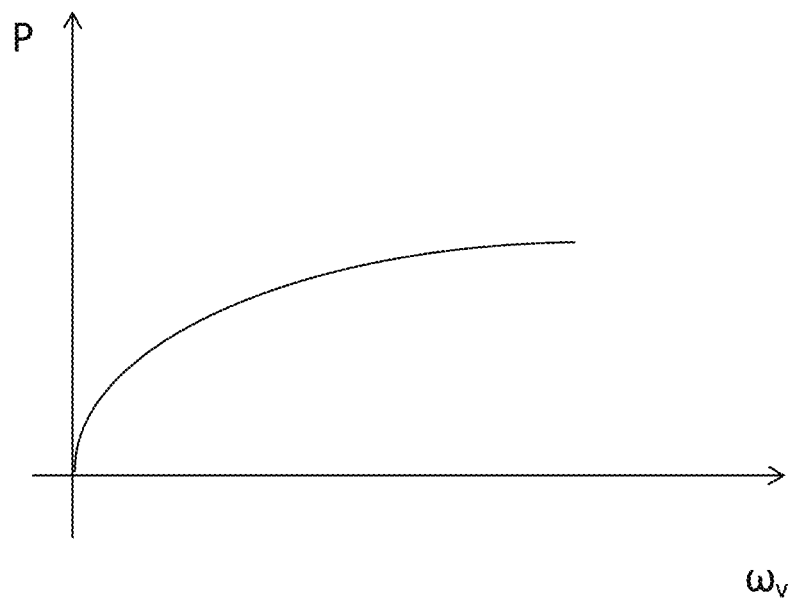
FIG. 3 is a diagram illustrating a possible trend of the power P recovered by the dynamo according to the invention as a function of the speed of the bicycle to which the dynamo is associated.

According to this mode, the energy recovered by the electric machine 2 operating as a generator, depends on the effective speed of the vehicle, particularly the recovered energy is higher at high speeds of the vehicle. A possible curve of the recovered power P as a function of the vehicle speed $\omega v$ is shown in FIG. 3. The vehicle speed $\omega v$ can be obtained by a speed sensor associated to a wheel. Preferably, such sensor is included in the dynamo 1 itself (in the closure body, for example) and can measure, for example, the angular speed of the rotor with respect to a stator, in order to supply to the control unit 6 a signal representative of such speed.

According to a possible embodiment, the relationship between the recovered power P and vehicle speed $\omega v$ can be further modulated as a function of the pedal-thrust cadence, in other words as a function of the speed/frequency $\omega p$ of the pedal-thrust exerted by the cyclist. For this purpose, the dynamo control unit 6 can be connected to a pedal-thrust cadence sensor suitable for generating a signal representative of the same. Indeed, it has been generally observed that the energy efficiency of the cyclist increases as the pedal-thrust speed increases: therefore, in case of high pedal-thrust speeds, it causes him/her to exert a greater effort particularly due to the energy recovery. According to such consideration, for example, the energy recovery can be provided, for example as shown in FIG. 3, to be activated only if it is detected a pedal-thrust speed greater than a threshold value. As an alternative, it is possible to modify such curve as a function of the detected pedal-thrust speed, for example by increasing the recovered power at high pedal-thrust speeds and by reducing it at low pedal-thrust speeds.

The cadence sensor can be wirelessly connected to the control unit 6, for example, in order to reduce the number of physical cables in the bicycle wherein the dynamo 1 is installed.

According to a possible embodiment, the control unit 6 is further configured for modulating the recovered energy by the electric machine 2 operating as a generator based on the charge level SOC of the battery, which for this purpose is also monitored by a suitable charge sensor connected to the control unit itself and adapted to generate a signal representative of the charge state of the battery. Preferably, particularly, the control unit 6 acts in order to increase the recovered power (and consequently the additional effort of the cyclist) at low charge levels, and in order to reduce the recovered power if the battery has a high charge level.

Figure 4:
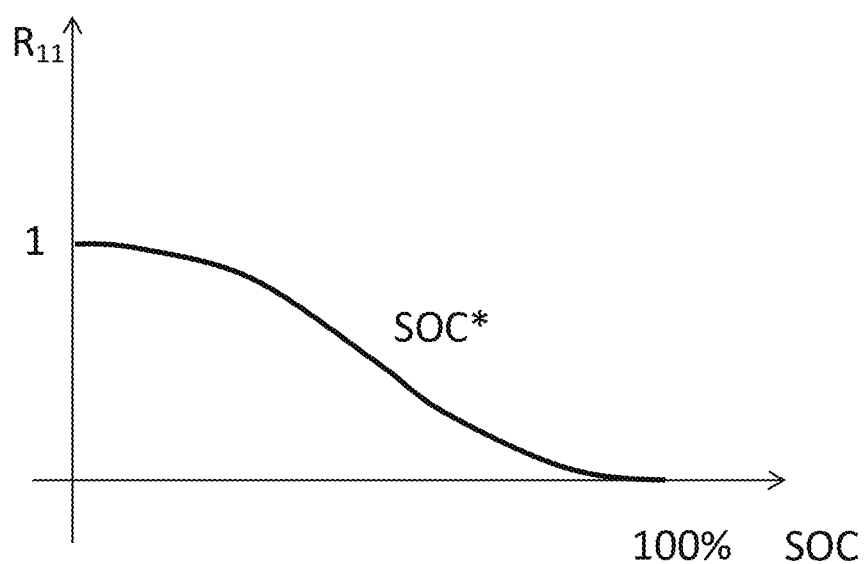
FIG. 4 is a diagram illustrating an example of a trend of a corrective coefficient R representative of the modulation of the power recovered by the dynamo according to the invention as a function of the charge state SOC of the battery thereof according to a further possible operative mode.

For example, the recovered power, based on the curve of the type illustrated in FIG. 3, can be modulated based on a coefficient R11 varying between 1 (corresponding to the charge level SOC condition of 0%) and 0 (corresponding to the charge level SOC of 100%), of which a possible trend is qualitatively shown in FIG. 4.

First Mode, Second Level: Energy Recovery, High Resistance

Also according to this mode, the energy recovered by the electric machine operating as a generator, depends on the effective speed of the vehicle, particularly the recovered energy is higher at high speeds of the vehicle. The qualitative trend of the recovered power P as a function of the vehicle speed $\omega v$ can be analogous to the one exemplifyingly shown in FIG. 3, however the absolute value of the recovered power is greater, with the same motion conditions of the bicycle, particularly with the same speeds.

Since this operative mode entails a high resistance to the pedal-thrust, it can be mainly used under conditions in which the cyclist does not have to pedal, typically along a descent and when braking.

Therefore, in this case it is necessary to modify the recovered power based on the pedal-thrust speed. However, the pedal-thrust cadence sensor (or a sensor distinct from it) can be also used for determining the braking condition which activates this operative mode from a backward pedal-thrust of the cyclist, as hereinbefore discussed.

According to this mode, further, it is preferred to not modulate the recovered power based on the charge level SOC of the battery since, particularly when braking, this would after the behavior of the bicycle, and therefore, what the cyclist perceives as a function of the charge level.

Figure 5:
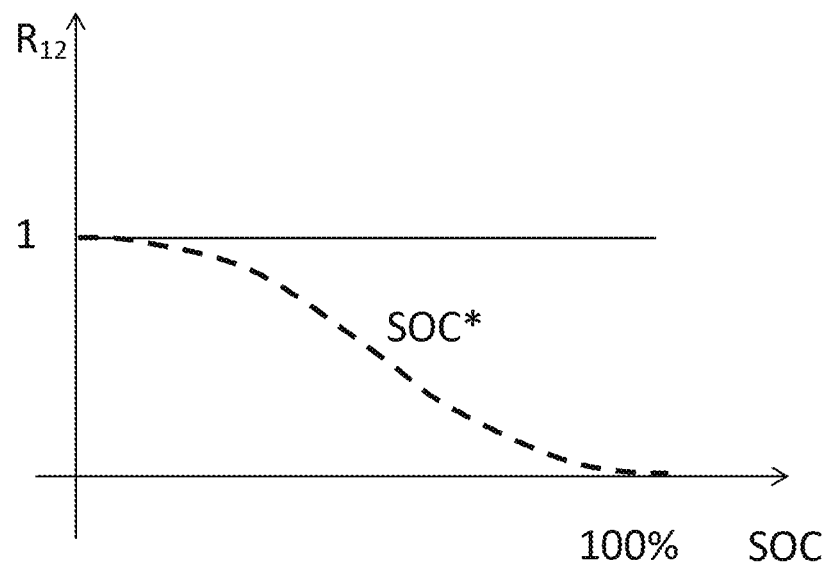
FIG. 5 is a diagram illustrating an example of a trend of a corrective coefficient R representative of the modulation of the power recovered by the dynamo according to the invention as a function of the charge state SOC of the battery thereof according to a further possible operative mode.

Therefore, in this case, the recovered power is therefore modulated as a function of a coefficient R12 which is constantly held equal to 1 independently from the charge level SOC of the battery (the continuous line in FIG. 5).

Obviously, despite what was written hereinbefore, in any case the control unit can again modulates the recovered power as a function of the charge level, in the same way as illustrated with reference to FIG. 4, based on a coefficient R12 varying between 1 (corresponding to the condition of the charge level SOC of 0%) and 0 (corresponding to the charge level SOC of 100%), as qualitatively shown by the broken line in FIG. 5.

Second Mode: Pedal-Thrust Assistance

According to this mode, the electric machine 2 operates as a motor and therefore the dynamo 1 supplies power in addition to the one delivered by the cyclist, by withdrawing the necessary energy from the battery 4.

The law by which the driving power (and also the driving torque) is supplied can be selected as a function of several criteria. For example, according to a possible logic, the control unit 6 can command the electric machine 2 to deliver an additional constant driving power. According to a possible alternative embodiment, the power P supplied by the electric machine, can be modulated as a function of the pedal-thrust cadence, in other words as a function of the pedal-thrust speed/frequency $\omega p$ exerted by the cyclist, measured by the beforehand cited cadence sensor, connected to the control unit 6. According to further variants, the supplied power can be modulated as a function of signals from one or more sensors applied to the bicycle itself, as a slope sensor for example.

According to a possible embodiment, it is also possible in this case to modulate the driving power supplied by the electric machine based on the charge level SOC of the battery 4. For this purpose, the charge level SOC can be monitored by the beforehand cited charge sensor connected to the control unit 6.

Figure 6:
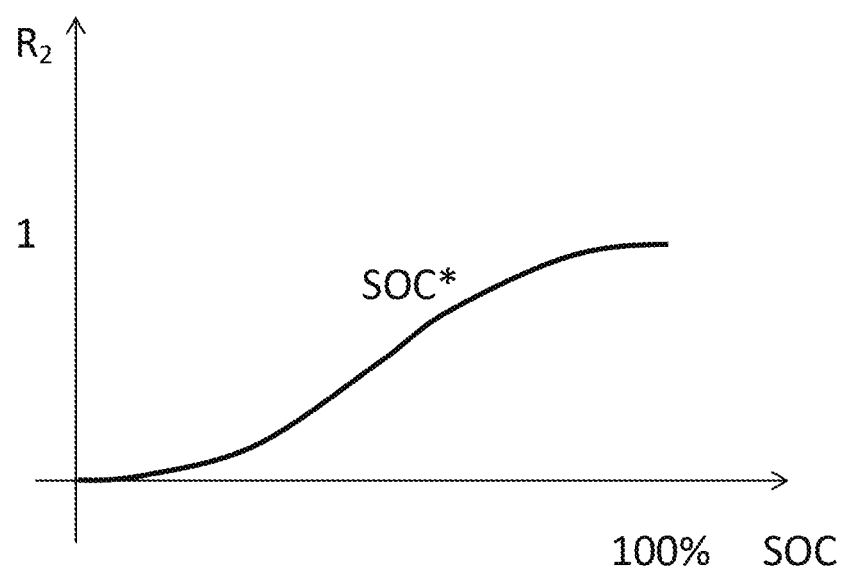
FIG. 6 is a diagram illustrating an example of a trend of a corrective coefficient R representative of the modulation of the power supplied by the dynamo according to the invention as a function of the charge state SOC of the battery thereof according to a possible further operative mode.

For example, the power to be supplied according to the beforehand cited criteria can be modulated based on a coefficient R2 varying between 0 (corresponding to the condition of the charge level SOC of 0%) and 1 (corresponding to the charge level SOC of 100%), as qualitatively shown in FIG. 6. In this case, if the charge level is low, the action of the motor is limited, instead the same can be increased if the charge level is high.

It is observed that the energy supplied by the electric machine 2 when is set according to the second operative mode, is completely made available to the cyclist him/herself when the electric machine is set to the first operative mode. Therefore, it is not necessary to connect the dynamo according to the invention, to external energy sources for recharging the batteries. According to a possible embodiment, the control unit is configured so that the electric machine 2, when is set to the second operative mode, withdraws from the batteries an energy amount not greater than the one stored in the batteries themselves when the electric machine is set to the first operative mode for a predetermined time before switching from the first to the second operative modes.

Moreover, it is observed, according to a possible alternative embodiment, that the control unit 6 is configured for performing a closed-loop control of the charge level SOC of the batteries. For example, once set a desired average charge value SOC*, when the electric machine is set to the first mode according to the first level (FIG. 4), or according to the second level (broken line, FIG. 5), the control unit will further modulate the absorbed power by varying the coefficient R11 and R12 so that the charge level will tend to maintain the desired level. Therefore, for example, if the electric machine operates as a generator and the charge level is much smaller than the desired value SOC*, the control unit will act so that the electric machine recovers a lot of power, which will gradually decrease until the charge level becomes stable at the desired level SOC*. Analogously, if the electric machine acts as a motor and the charge level is much higher than the desired value SOC*, the control unit will act on the electric machine so that it supplies a high power, which will gradually decrease until the charge level becomes stable at the desired level SOC*.

From the above given descriptions, a person skilled in the art could appreciate as the dynamo according to the invention enables an energy optimization with respect to the known dynamos. Indeed, if the electric machine operates as a generator, the cyclist can select between two recovery levels, corresponding to a low resistance (first level) and to a high resistance (second level). The resistances associated to the first and second levels are dynamically selected by the control unit in order to be respectively less and greater than the single resistance offered by the dynamos according to the prior art. In this way, the cyclist can select to recover a small amount of energy (therefore can select to have a limited resistance due to the dynamo) under normal conditions and to recover a large amount of energy under particular conditions, for example when descending or braking, wherein the high resistance offered by the electric machine does not hinder the pedal-thrust. The dynamo, according to the invention, further enables to store energy, which in the dynamos according to the prior art, is dissipated into heat, which can be used when necessary by operating the electric machine as a motor and not as a generator.

To the described embodiments of the dynamo according to the invention, a person skilled in the art in order to satisfy specific contingent needs, can add several additions, modifications, or substitutions of elements with other operatively equivalent, without falling out of the scope of the attached claims.

That which is claimed is:

1. A hub dynamo connectable to a wheel of a bicycle, comprising:
   an electric machine operable alternatively as a generator and as a motor;
   one or more batteries connected to the electric machine to exchange energy with the electric machine;
   a closure body connectable to the wheel to rotate coaxially with the wheel, the closure body internally containing the electric machine and the one or more batteries; the closure body being free of connectors for connecting the one or more batteries to external energy sources, so that the one or more batteries are only rechargeable by the electric machine acting as the generator due to rotation of the wheel;
   a control unit configured for commanding the electric machine:
      according to a first mode, wherein the electric machine acts as the generator and converts a rotational mechanical energy of the wheel into recovered electric energy to be stored in the one or more batteries, the first mode being further configurable by the control unit according to a first recovered energy level and a second recovered energy level, wherein the first recovered energy level is less than the second recovered energy level under a same motion condition of the bicycle;
      according to a second mode, wherein the electric machine acts as the motor and delivers additional power to the wheel by withdrawing energy from the one or more batteries;
   wherein the control unit is configured to automatically select between at least one chosen from 1) the first mode and the second mode and 2) the first energy recovery level and the second energy recovery level, at least partly based on signals arriving from at least one chosen from a sensor and one or more command members operatively connected to the control unit and commandable by a user for selecting between the at least one chosen from 1) the first mode and the second mode and 2) the first energy recovery level and the second energy recovery level;
   a charge sensor for detecting a charge level of the one or more batteries, operatively connected to the control unit and configured for generating a signal representative of the charge state of the one or more batteries;
   wherein the control unit is configured for commanding the electric machine according to the first mode such that, under the same motion conditions of the bicycle, the recovered electrical energy increases as the charge level of the one or more batteries decreases.

2. The hub dynamo according to claim 1, and further comprising a sensor for detecting a speed of the wheel, connected to the control unit and generating a signal representative of the speed of the wheel.

3. The hub dynamo according to claim 2, wherein the control unit is configured for commanding the electric machine according to the first mode so that the recovered electrical energy increases as the speed of the wheel increases.

4. The hub dynamo according to claim 1, and further comprising a sensor for detecting a cadence of a pedal-thrust of the bicycle, operatively connected to the control unit and configured for generating a signal representative of the pedal-thrust cadence, wherein the control unit is configured for commanding the electric machine according to at least one chosen from the first mode such that the recovered electrical energy is modified as a function of the pedal-thrust cadence and the second mode such that the delivered additional power is modified as a function of the pedal-thrust cadence.

5. The hub dynamo according to claim 1, wherein the control unit is configured for commanding the electric machine according to the second recovered energy level of the first mode such that the recovered electrical energy is independent from the charge level of the one or more batteries.

6. The hub dynamo according to claim 1, wherein the control unit is configured for commanding the electric machine according to the second mode, such that, under the same motion conditions of the bicycle, the delivered additional power decreases as the charge level of the one or more batteries decreases.

7. The hub dynamo according to claim 1, wherein the control unit is configured for performing a dosed-loop control of the charge level.

8. The hub dynamo according to claim 1, wherein the control unit is configured such that the electric machine, when set at the second mode, withdraws from the one or more batteries an energy amount not greater than an energy amount stored in the one or more batteries when the electric machine is set at the first mode for a predetermined time before switching from the first mode to the second mode.

9. The hub dynamo according to claim 1, further comprising one or more outlets for connecting external devices, wherein the one or more outlets comprise first one or more outlets for supplying critical loads from at least one chosen from the electric machine acting as a generator and the one or more batteries, and second one or more outlets for supplying non-critical loads by only the one or more batteries.

10. The hub dynamo according to claim 1, wherein the control unit is configured such that the first mode set at the first recovered energy level is a normal operative mode of the electric machine.

11. The hub dynamo according to claim 1, wherein the electric machine is configured to gradually and continuously switch between the first recovered energy level and the second recovered energy level.

12. A hub dynamo connectable to a wheel of a bicycle, comprising:
   a closure body connectable to the wheel to rotate coaxially with the wheel;
   an electric machine located inside the closure body and operable alternatively as a generator and as a motor;
   one or more batteries located inside the closure body and connected to the electric machine to exchange energy with the electric machine;
   a control unit configured for commanding the electric machine:
      according to a first mode, wherein the electric machine acts as the generator and converts a rotational mechanical energy of the wheel into recovered electric energy to be stored in the one or more batteries, the first mode being further configurable by the control unit according to a first recovered energy level and a second recovered energy level, wherein the first recovered energy level is less than the second recovered energy level under a same motion condition of the bicycle;
      according to a second mode wherein the electric machine acts as the motor and delivers additional power to the wheel by withdrawing energy from the one or more batteries;
   wherein the closure body is free of connectors for connecting the batteries to external energy sources, so that the one or more batteries are only rechargeable by the electric machine acting as the generator due to rotation of the wheel;
   a charge sensor operatively connected to the control unit and configured to generate a signal representative of a charge level of the one or more batteries; and
   wherein the control unit is configured to automatically select between at least one chosen from 1) the first mode and the second mode, and 2) the first energy recovery level and the second energy recovery level, at least partly based on the charge level of the one or more batteries.

13. A wheel of a bicycle, comprising:
   a wheel rim including radial spokes running from a rotational center of the wheel;
   the hub dynamo according to claim 12 connected to the radial spokes of the wheel rim, concentrically to the rotational center.

\* \* \* \* \*